United States Patent
Savalle et al.

(10) Patent No.: US 10,616,251 B2
(45) Date of Patent: Apr. 7, 2020

(54) ANOMALY SELECTION USING DISTANCE METRIC-BASED DIVERSITY AND RELEVANCE

(71) Applicant: Cisco Technology, Inc., San Jose, CA (US)

(72) Inventors: Pierre-André Savalle, Rueil-Malmaison (FR); Grégory Mermoud, Veyras (CH); Laurent Sartran, Palaiseau (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 15/440,116

(22) Filed: Feb. 23, 2017

(65) Prior Publication Data

US 2018/0241762 A1 Aug. 23, 2018

(51) Int. Cl.
*H04L 29/06* (2006.01)
*G06N 20/00* (2019.01)
*G06N 3/00* (2006.01)

(52) U.S. Cl.
CPC ......... *H04L 63/1425* (2013.01); *G06N 3/006* (2013.01); *G06N 20/00* (2019.01); *H04L 63/1441* (2013.01); *H04L 63/1458* (2013.01); *H04L 2463/141* (2013.01); *H04L 2463/144* (2013.01)

(58) Field of Classification Search
CPC ............ H04L 63/1426; H04L 63/1458; H04L 63/1441; H04L 2463/141; H04L 2463/144; G06N 99/005
See application file for complete search history.

(56) References Cited

U.S. PATENT DOCUMENTS

| | | | |
|---|---|---|---|
| 8,887,286 B2 * | 11/2014 | Dupont | G06F 21/00 726/25 |
| 9,237,161 B2 | 1/2016 | Humble et al. | |
| 9,398,034 B2 * | 7/2016 | Ronen | G06F 21/56 |
| 9,407,652 B1 * | 8/2016 | Kesin | G06N 7/005 |
| 9,516,053 B1 * | 12/2016 | Muddu | G06F 16/254 |
| 2016/0080417 A1 * | 3/2016 | Thomas | H04L 63/20 726/1 |
| 2016/0217022 A1 * | 7/2016 | Velipasaoglu | G06F 11/079 |

* cited by examiner

*Primary Examiner* — Khoi V Le
(74) *Attorney, Agent, or Firm* — Behmke Innovation Group LLC; James Behmke; Stephen D. LeBarron

(57) ABSTRACT

In one embodiment, a device in a network receives a notification of a particular anomaly detected by a distributed learning agent in the network that executes a machine learning-based anomaly detector to analyze traffic in the network. The device computes one or more distance scores between the particular anomaly and one or more previously detected anomalies. The device also computes one or more relevance scores for the one or more previously detected anomalies. The device determines a reporting score for the particular anomaly based on the one or more distance scores and on the one or more relevance scores. The device reports the particular anomaly to a user interface based on the determined reporting score.

15 Claims, 9 Drawing Sheets

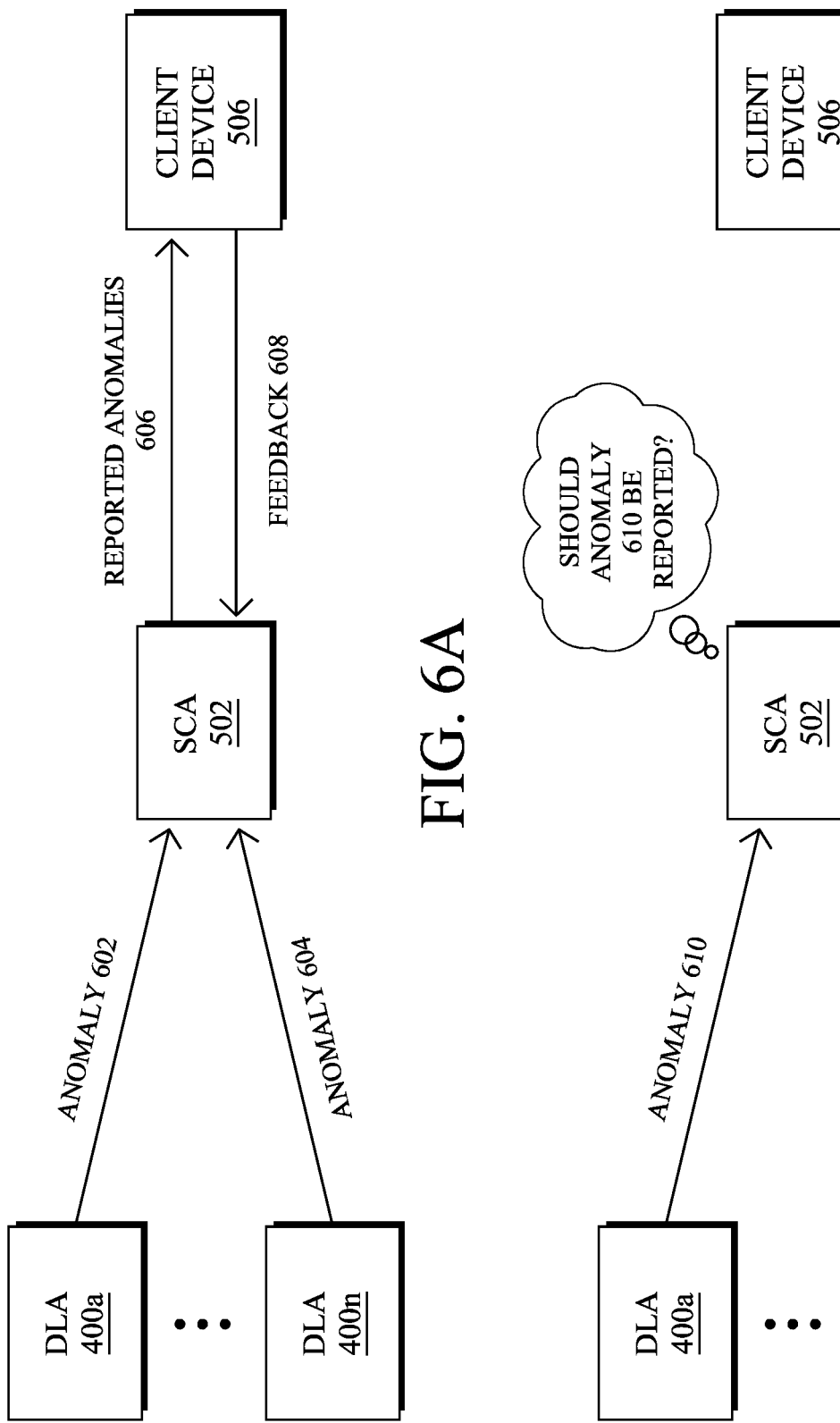

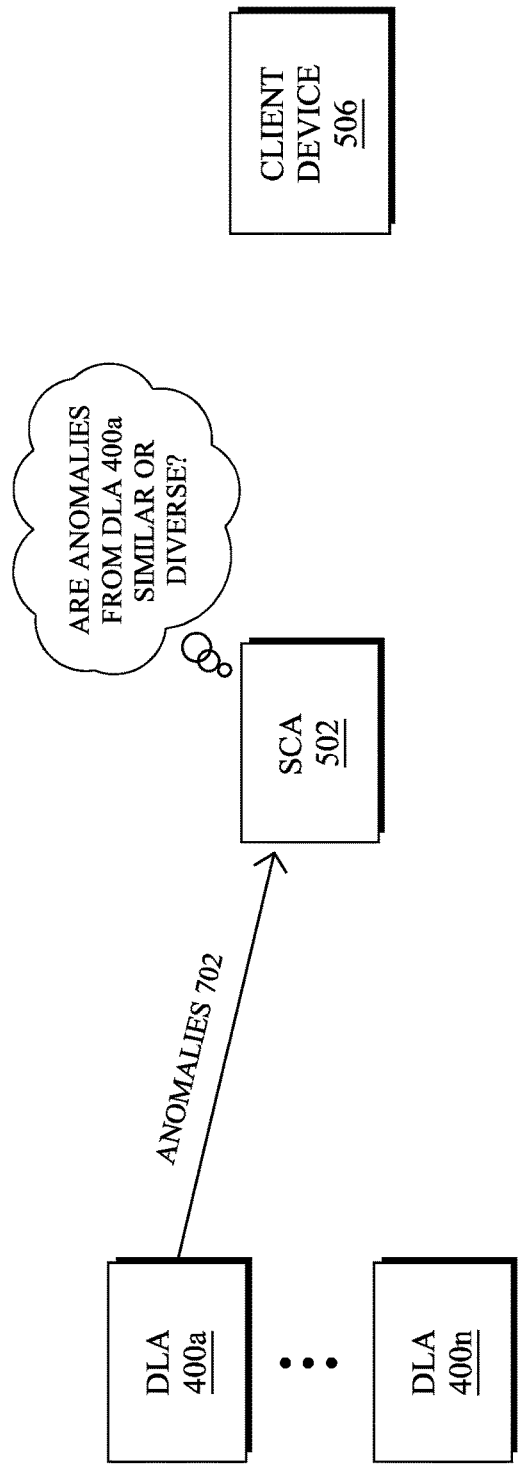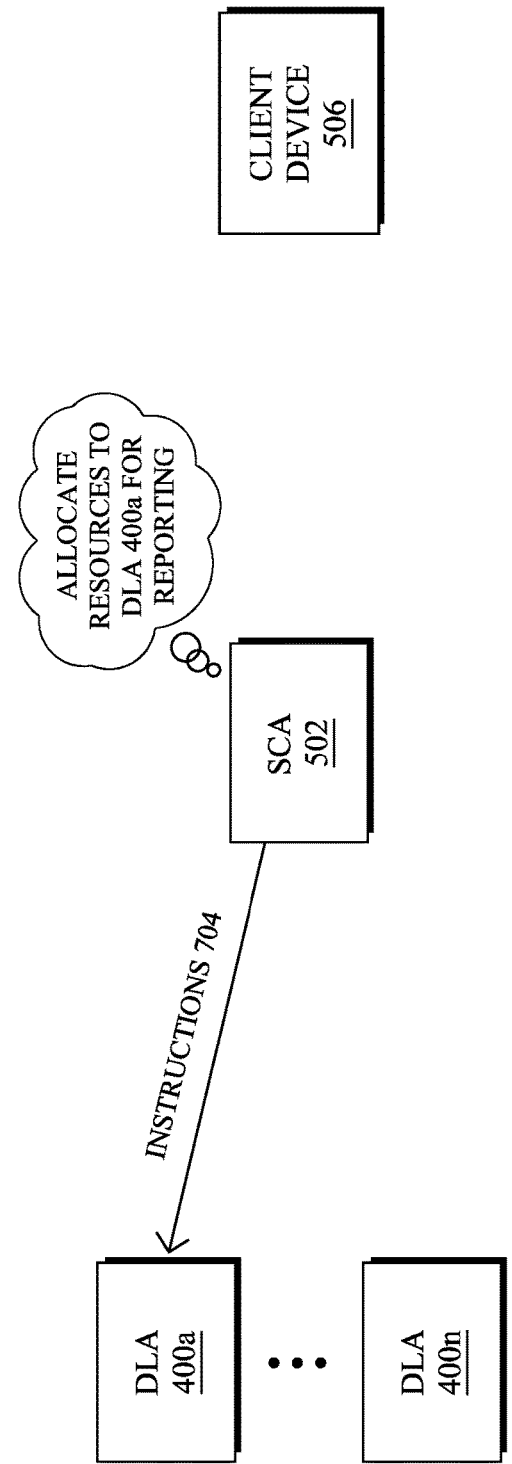

ANOMALY SELECTION USING DISTANCE METRIC-BASED DIVERSITY AND RELEVANCE

TECHNICAL FIELD

The present disclosure relates generally to computer networks, and, more particularly, to select anomalies using distance-metric based diversity and relevance.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6B illustrate examples of a device selectively reporting detected anomalies;

FIGS. 7A-7B illustrate examples of a device causing the allocation of network resources to a DLA.

DESCRIPTION OF EXAMPLE EMBODIMENTS

Overview

Figure 1A:
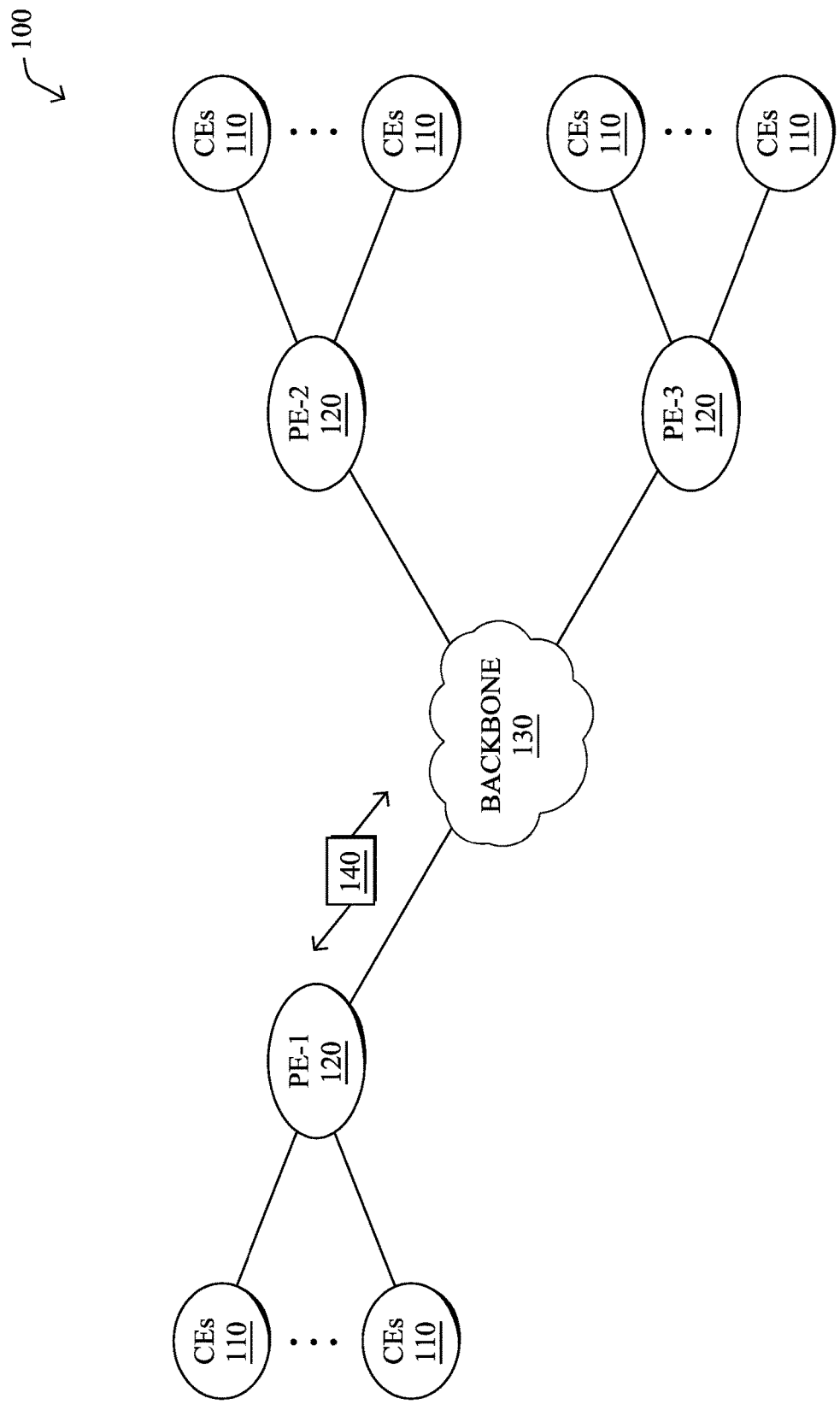
FIGS. 1A-1B illustrate an example communication network.

According to one or more embodiments of the disclosure, a device in a network receives a notification of a particular anomaly detected by a distributed learning agent in the network that executes a machine learning-based anomaly detector to analyze traffic in the network. The device computes one or more distance scores between the particular anomaly and one or more previously detected anomalies. The device also computes one or more relevance scores for the one or more previously detected anomalies. The device determines a reporting score for the particular anomaly based on the one or more distance scores and on the one or more relevance scores. The device reports the particular anomaly to a user interface based on the determined reporting score.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
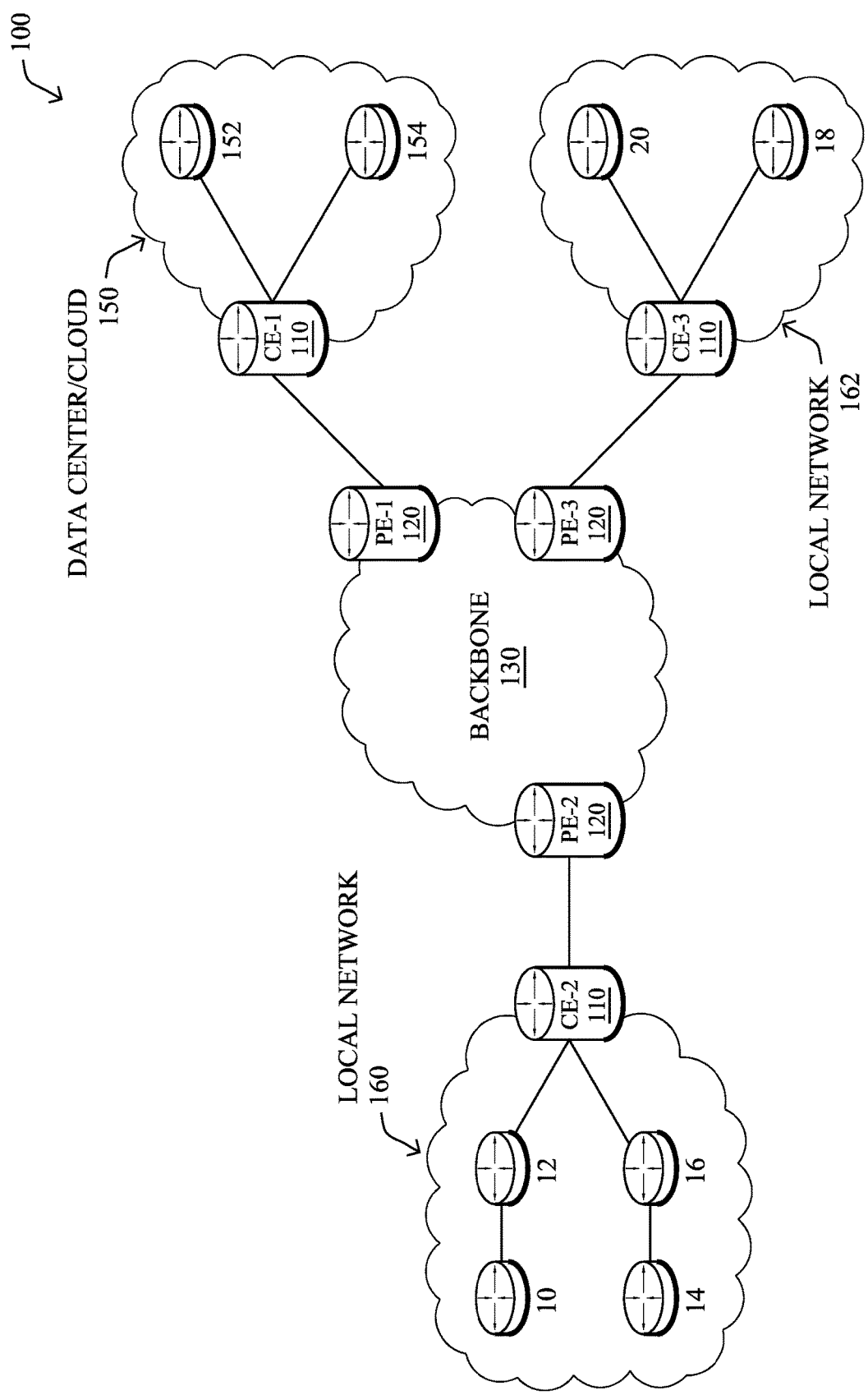

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
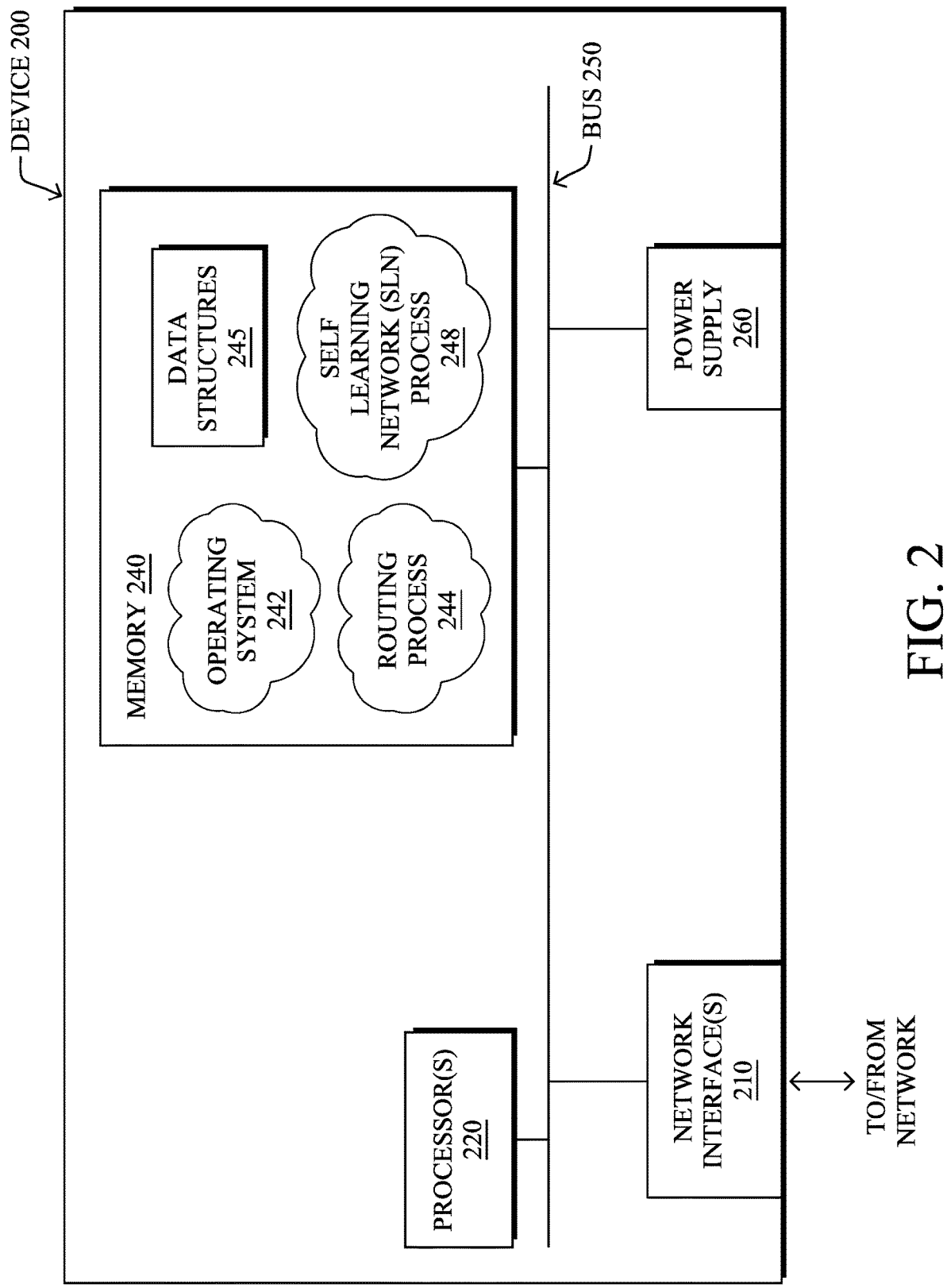
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures)

may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
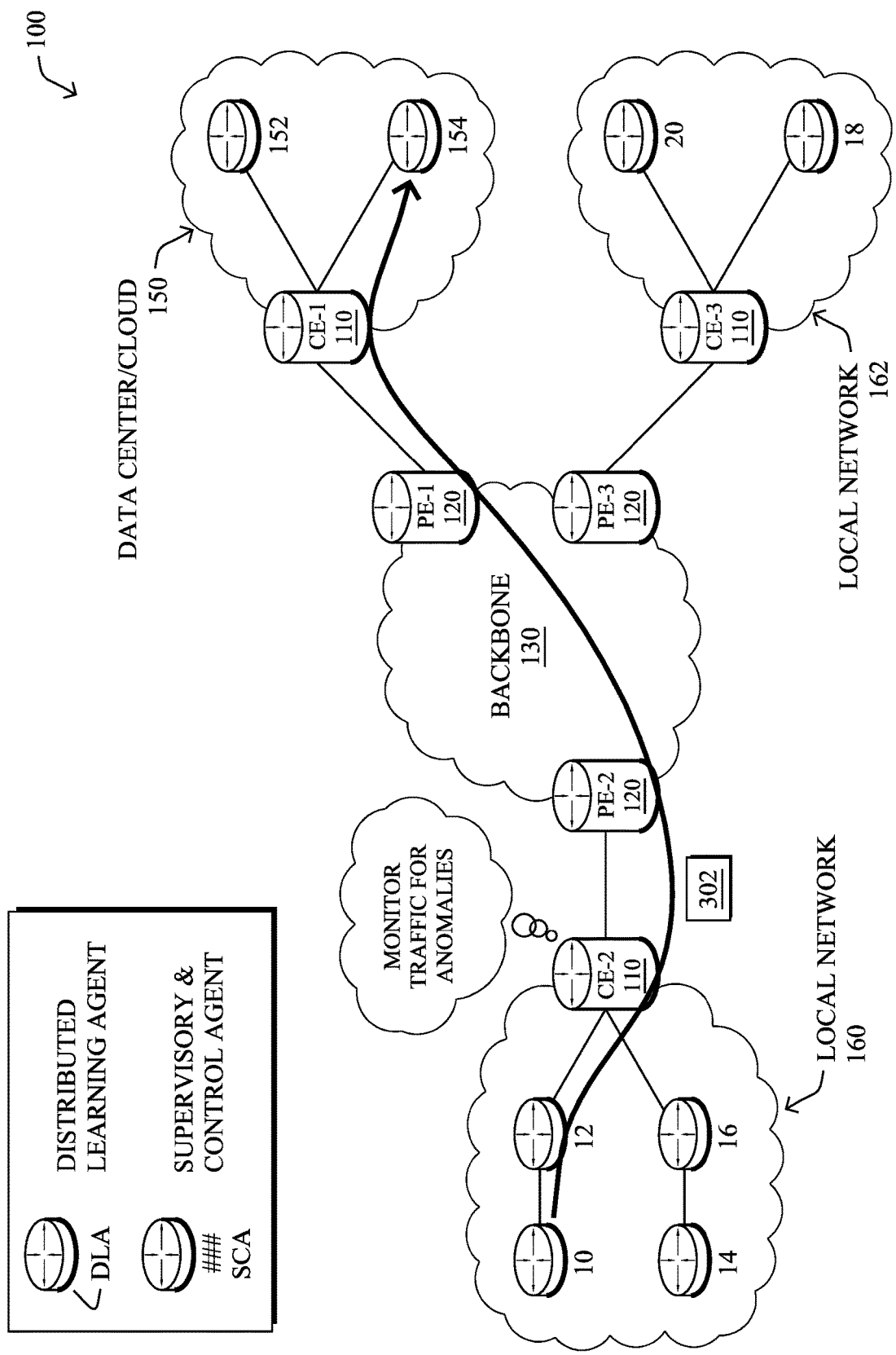
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
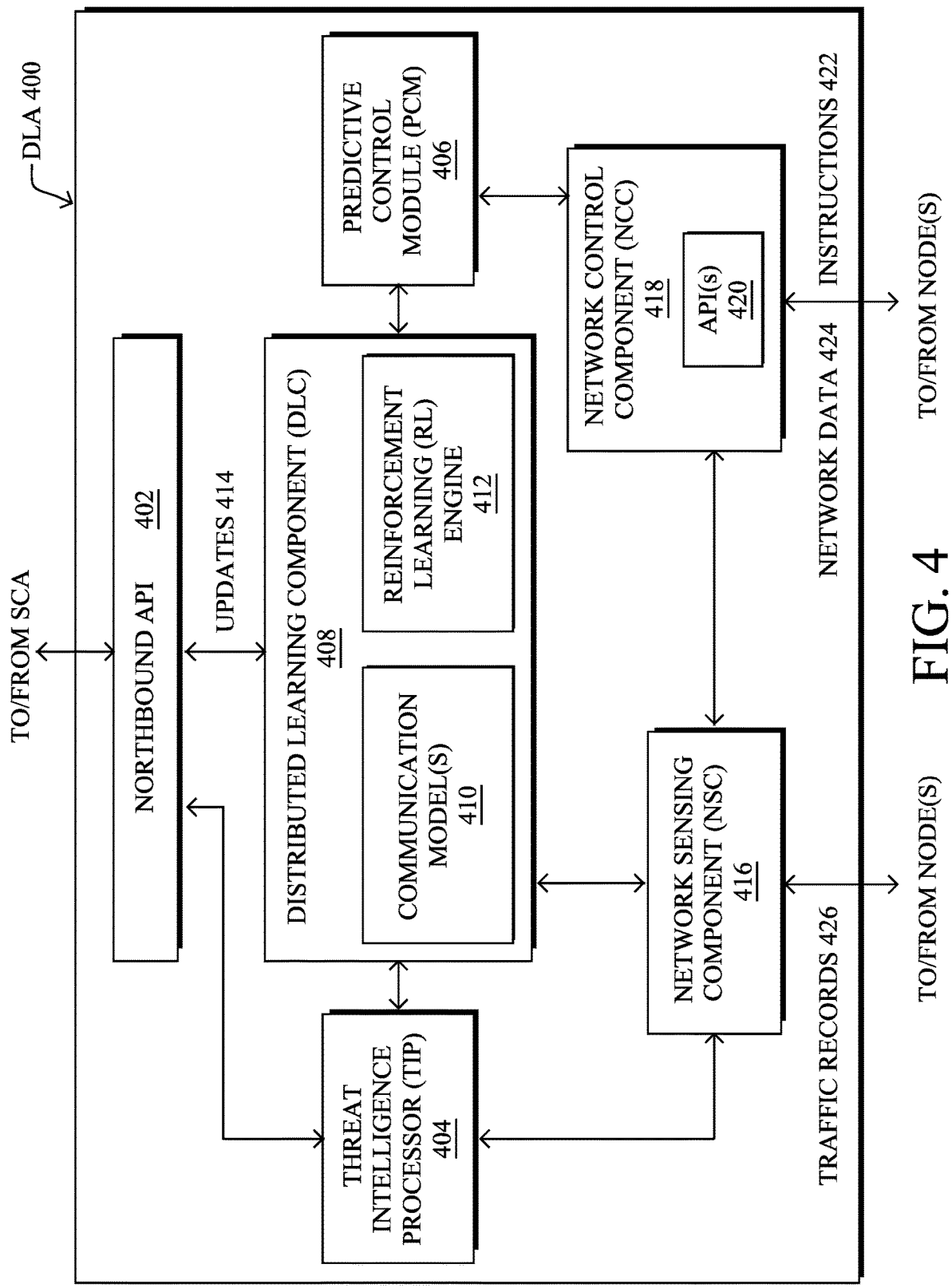
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, distributed anomaly detection systems allow for the monitoring of events (e.g., network traffic) that occur in a distributed fashion and can scale to very large systems. In such distributed settings, although the DLA may be able to exchange information in a peer-to-peer (e.g., between DLAs) or hub-and-spoke (e.g., between DLAs and an SLA) manner, a substantial portion of the computation and decision of whether an event is anomalous is usually made by the agent itself, with imperfect and partial knowledge of the overall system state. For example, with a large number of DLAs, a moderately rare phenomenon may have been observed multiple times at the scale of the system as a whole, but very rarely at the level of a single DLA. Depending on the extent to which the DLAs communicate and exchange information, a single DLA might thus consider anomalous something that is actually rather frequent at the scale of the whole system. Of note also is that a typical implementation may include dozens of DLAs across the entire system.

A core functionality of the anomaly detection system described herein to raise alerts regarding detected anomalies that are of relevance to the user/administrator. However, the definition of what constitutes a relevant anomalous event may vary depending on application, the subjective views of the actual users/administrators, etc.

In some cases, a feedback mechanism may be employed between the user interface and the DLAs, thereby allowing the DLAs to control which anomalies are reported by the DLAs. However, in further cases, a DLA may not have the sufficient capacity to correctly optimize for the end user's utility, due to its limited view of the overall system and events, as well as potentially the computational and storage resources of the DLA.

Anomaly Selection Using Distance Metric-Based Diversity and Relevance

The techniques herein introduce a mechanism that selects relevant anomaly for reporting to a user interface, based on anomalies raised by DLAs with imperfect knowledge of the full system. In some aspects, a central controller, such as an SCA, builds models of distance and similarity between previously detected anomalies. When a new anomaly is observed at a DLA, the central controller may decide whether to report the new anomaly to the user interface based on its similarity to the previously detected anomalies and the relevance of the prior anomalies. Said differently, the techniques herein allow a central control to explore the space of anomalies raised by the DLA(s), to present the most relevant anomalies to the user interface according to a given criterion, by mapping the anomalies into a metric space. Notably, the central controller may build a space of anomalies and score new, incoming anomalies according to their similarity with past anomalies and the relevance of such similar past anomalies. In contrast with approaches in which anomalies of interest are evaluated using a relevance metric, the techniques herein rank the degree of interest of an anomaly according to a distance between the anomaly under scrutiny and other anomalies raised in the past.

Specifically, according to one or more embodiments of the disclosure as described in detail below, a device in a network receives a notification of a particular anomaly detected by a distributed learning agent in the network that executes a machine learning-based anomaly detector to analyze traffic in the network. The device computes one or more distance scores between the particular anomaly and one or more previously detected anomalies. The device also computes one or more relevance scores for the one or more previously detected anomalies. The device determines a reporting score for the particular anomaly based on the one or more distance scores and on the one or more relevance scores. The device reports the particular anomaly to a user interface based on the determined reporting score.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 5:
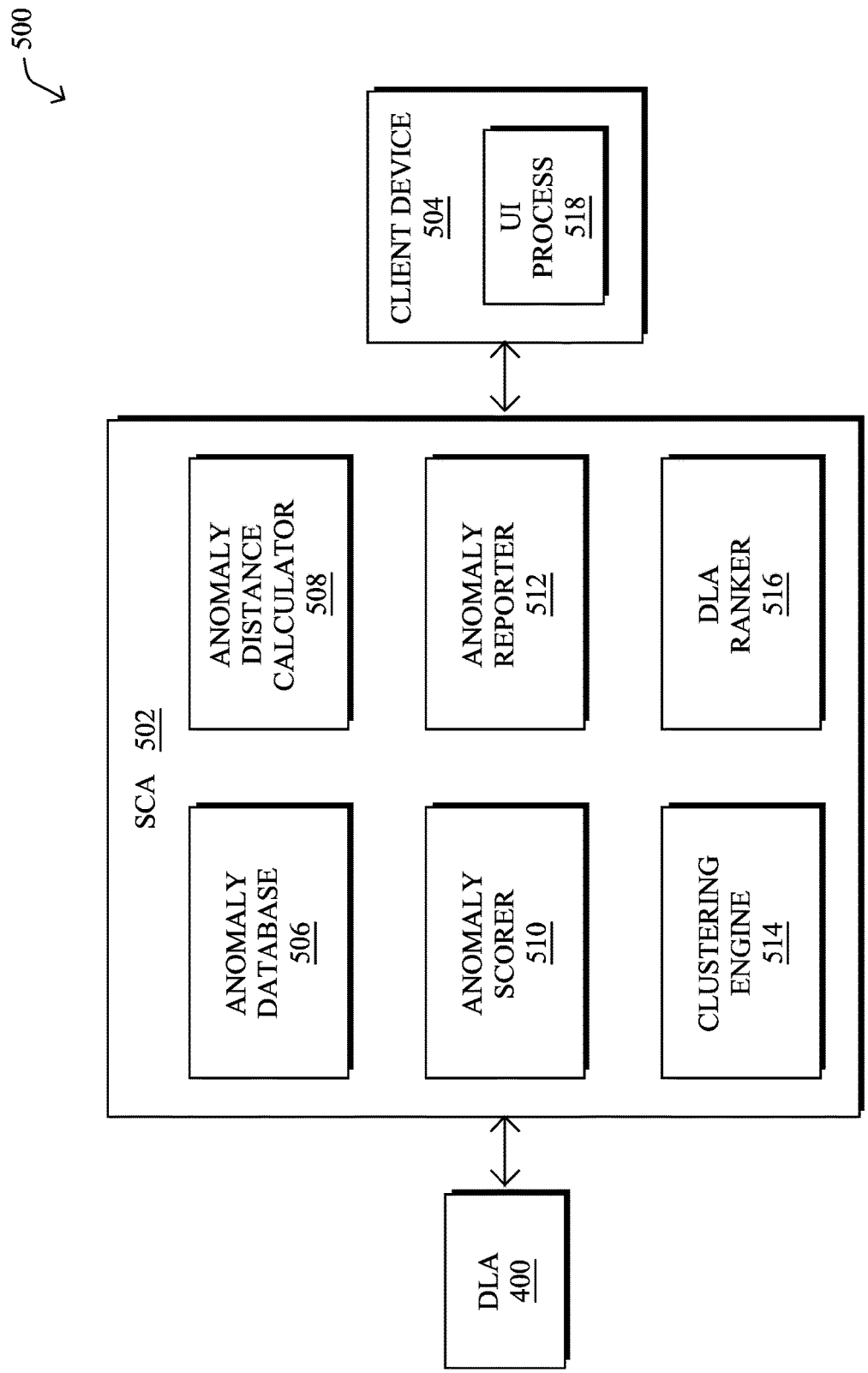
FIG. 5 illustrates an example architecture for reporting a detected anomaly in an SLN.

Operationally, FIG. 5 illustrates an example architecture 500 for reporting a detected anomaly in an SLN, according to various embodiments. One aspect of the techniques herein illustratively involves a remote learning agent that is equipped with a machine learning-based anomaly detection engine, such as DLA 400 shown. Notably, the anomaly detection engine (e.g., DLC 408) may use a set of machine learning models, to detect anomalies at the edge of a local network and/or deeper within the network. For example, DLC 408 may employ an unsupervised machine learning-based anomaly detector that identifies statistical deviations in the characteristics of the network traffic. DLA 400 may also employ a traffic capture mechanism (e.g., NSC 416, etc.) that is in charge of dynamically capturing traffic data of interest.

As described above, architecture 500 may also include an SCA 502 that provides supervisory control over DLA 400 and receives notification of any of the anomalies detected by DLA 400. In turn, SCA 502 may report the detected anomalies to a user interface (UI) process 518, which may be executed by a client device 504 in communication with SCA 502 or direction on SCA 502. Notably, SCA 502 may generate visualizations for display by UI process 518, thereby allowing an administrator or other user to review the anomaly detection mechanisms in the network and any detected anomalies. In response, the user may provide feedback via UI process 518 regarding any detected anomalies and/or the reporting mechanism to SCA 502. The user may also provide, via UI process 518, other configurations, settings, or the like, to SCA 502, to adjust the operation of the SLN. In further embodiments, UI process 518 may be executed directly on SCA 502.

In some embodiments, SCA 502 may be configured to compute distances between anomalies. For example, SCA 502 may execute an anomaly distance calculator 508 that computes the distances between anomalies stored in an anomaly database 506 of anomalies reported by the various DLAs in the network (e.g., DLA 400 shown, etc.). In general, an anomaly may be represented by the feature vector of observed network characteristics that triggered the anomaly detector of a DLA. For example, a given anomaly may comprise a highly dimensional vector of traffic features such as average packet size, flow duration, binary indicators as to whether the traffic flow is an HTTP flow, a DNS flow, etc.

In one embodiment, anomaly distance calculator 508 may execute a static set of rules that have been defined by one or more domain experts based on their knowledge. In another embodiment, anomaly distance calculator 508 may employ a dynamic model. In such a case, for example, the static expert model may serve as a baseline and UI process 518 may provide feedback to anomaly distance calculator 508 regarding the distance between two anomalies reported to UI process 518 by SCA 502. In turn, anomaly distance calculator 508 may use this similarity feedback as input to statistical methods, to infer a distance metric between anomalies that is the most consistent with the user-provided similarity feedback (e.g., using a statistical model). In various cases, this feedback functionality of UI process 518 may be integrated in the full anomaly detection system and workflow or, alternatively, be separate and be used to derive a distance metric between anomalies through offline user studies.

In some cases, anomaly database 506 may be of various forms, to store information about previously detected and reported anomalies. In some instances, anomaly database 506 may be a traditional database that potentially uses compression to reduce its storage size. In other cases, anomaly database 506 may comprise an ad-hoc approximate data structure, such as classical locality sensitive hashing data structures. In some embodiments, SCA 502 may also push some or all of anomaly database 506 to the various DLAs in the network, possibly in an incremental fashion. Doing so, for example, may help to share anomaly information among the various DLAs.

SCA 502 may also execute an anomaly scorer 510 that leverages anomaly database 506 and anomaly distance calculator 508, to determine a reporting score for a particular anomaly detected and reported by DLA 400. In various embodiments, these elements may operate in conjunction with one another as follows:

1. Anomaly distance calculator 508 computes the distance(s) between the particular anomaly and the previously seen anomalies in anomaly database 506 (e.g., either in exact form or as approximations in the database). In some embodiments, lower bounds on distances between pairs of anomalies may be sufficient, and may be efficiently computed by anomaly distance calculator 508 using appropriate data structures such as k-d trees. Once computed, anomaly distance calculator 508 then provides the distances to anomaly scorer 510.
2. Anomaly scorer 510 may compute one or more relevance scores for the previously seen anomalies in anomaly database 506 (e.g., based as feedback from UI process 518). Anomaly scorer 510 may then combine these relevance score(s) with the (lower bound on the) distance to the current anomaly under scrutiny into a single value score. In some cases, this can be performed according to a weighting function that discounts the relevance of an anomaly according to its distance to the anomalies in anomaly database 506, such that the value score can be interpreted as the average relevance of similar anomalies.
3. Anomaly scorer 510 may also compute a similarity score for the anomalies. For example, such a similarity score may be based on a weighting function that discounts an anomaly according to its distance to the current anomaly.
4. Anomaly scorer 510 may combine the relevance and similarity scores into a single reporting score for the particular anomaly (e.g., by adding, multiplying, etc. the scores). Doing so allows for a final reporting score that takes into account both the diversity aspect of the particular anomaly (e.g., how new the anomaly actually is) and the relevance aspect of the particular anomaly (e.g., how relevant the anomaly may be to the user, based on prior user feedback). In one embodiment, anomaly scorer 510 may use a static weighting of the relevance and similarity scores, though not necessarily linear, to calculate the final reporting score. In another embodiment, the final reporting score may also take into account explicit feedback from UI process 518 on the reported anomalies in general, such as "Did you dislike this anomaly because it was too similar to past anomalies or because it was irrelevant?"

Usually, the final reporting score from anomaly scorer 510 will place non-negligible weighting on the diversity aspect to force exploration of the anomaly space. As would be appreciated, this is required to show new kind of anomalies to the user which is, in turn, necessary to get a good evaluation of the relevance everywhere in the anomaly space. Orthogonally, the weighting can also be dependent upon time and overall amount of feedbacks, such that the exploration is stronger when the system is beginning to operate.

Based on the final reporting score computed by anomaly scorer 510, anomaly reporter 512 may determine whether to report the particular anomaly under analysis. For example, anomaly reporter 512 may only provide a notification regarding the anomaly to UI process 518 if the reporting score for the anomaly is above a predefined threshold. In further embodiments, UI process 518 may request anomalies that are above a specified reporting score threshold or the n-number of anomalies with the highest reporting scores (e.g., the user of client device 504 may opt to see the top ten anomalies, etc.).

In various embodiments, the scoring operations of anomaly reporter 512, anomaly scorer 510, anomaly distance calculator 508, and anomaly database 506 may instead be implemented on DLA 400, instead of centrally on SCA 502. In other words, DLA 400 may itself determine whether to report a detected anomaly to SCA 502, based on the reporting score of the anomaly.

In some embodiments, SCA 502 may execute a clustering engine 514 that performs clustering on detected anomalies based on their distance scores computed by anomaly distance calculator 508. In turn, clustering engine 514 may report the clustering information to UI process 518 for review by the user/administrator. For instance, data exfiltration events/anomalies may be clustered together. The user of client device 504 may then label the clustered anomalies as "data exfiltration," thus allowing future similar events to be directly qualified as such by SCA 502. This clustering step may be performed using any number of clustering approaches, such as the Ordering Points to Identify the Clustering Structure (OPTICS) approach.

In yet another embodiment, SCA 502 may execute a DLA ranker 516 that ranks the various DLAs according to their ability to "see" anomalies with the highest degree of diversity. In other words, DLA ranker 516 may quantify how diverse the anomalies detected by a given DLA are in relation to one another. Indeed, in most highly scalable architectures, DLAs are subject to seeing anomalies that may be very similar to one another or, alternatively, a very diverse set of anomalies. By grouping remote agents as a function of diversity scores, this potentially allows for a SCA 502 to allocate resources to a given DLA 400 (e.g., WAN bandwidth, other networking resources, etc.), according to the diversity scores of its anomalies.

FIGS. 6A-6B illustrate examples of a device selectively reporting detected anomalies, according to various embodiments. As shown in FIG. 6A, assume that SCA 502 acts as a supervisory device over any number of deployed DLAs 402a-402n (e.g., a first through nth DLA) in the network. For example, DLA 400a may report a detected anomaly 602 to SCA 502, DLA 400n may report a detected anomaly 604 to SCA 502, etc. In particular, the DLAs may send notifications to SCA 502 indicative of detected anomalies which may include any or all of the available information regarding the anomaly. In turn, SCA 502 may report anomalies 606 to client device 506 for presentation to the user/administrator.

As noted above, anomalies may have any number of different underlying causes ranging from malware to simply previously unseen applications or behaviors in the network. Accordingly, reporting all anomalies to client device 506 may overwhelm a user/administrator. In various embodiments, the system may be configured to allow the user of client device 506 to provide feedback 608 regarding the reported anomalies 606. For example, feedback 608 may specify the relevance of a particular anomaly to the user, the subjective similarity between two or more anomalies from the viewpoint of the user, a label for a cluster of anomalies, etc.

As shown in FIG. 6B, SCA 502 may use feedback 608 to control whether a particular anomaly 610 (e.g., as detected and reported by DLA 400a) should be reported to client device 506 for review by the user/administrator. Such a determination may take into account the distance and/or similarity between anomaly 610 and previously detected anomalies, as well as the relevance of the previously detected anomalies to the user of client device 506. For example, if anomaly 610 is nearly identical to a previously reported anomaly, that has a low relevancy score (e.g., based on feedback 608 from the user), SCA 502 may prevent anomaly 610 from being proactively reported to client device 508. Conversely, SCA 502 may report anomaly 610 to client device 506 if anomaly 610 is very different from previously encountered anomalies (e.g., to explore the anomaly space for additional feedback from the user), if anomaly 610 is close to one or more prior anomalies that were of high relevance, etc. This allows the system to automatically control and explore the types of reported anomalies, while preventing the user from becoming overloaded with reported anomalies.

FIGS. 7A-7B illustrate examples of a device causing the allocation of network resources to a DLA, according to various embodiments. As shown in FIG. 7A, assume that SCA 502 receives notifications of anomalies 702 detected by DLA 400a. In turn, SCA 502 may rank DLA 400a based on the diversity or similarity of the reported anomalies 702 and may also take into account the corresponding relevance of the anomalies. As shown in FIG. 7B, SCA 502 may send one or more instructions 704 to the networking device(s) associated with DLA 400a, to allocate networking resources based on the ranking of DLA 400a. For example, if DLA 400a reports a very diverse set of anomalies 702, SCA 502 may allocate additional resources to DLA 400a, so that a larger anomaly space can be explored for purposes of reporting. Conversely, if the anomalies 702 reported by DLA 400a are all very similar and of low relevance, SCA 502 may decrease the resources allocated to DLA 400a or leave them at a default level.

Figure 8:
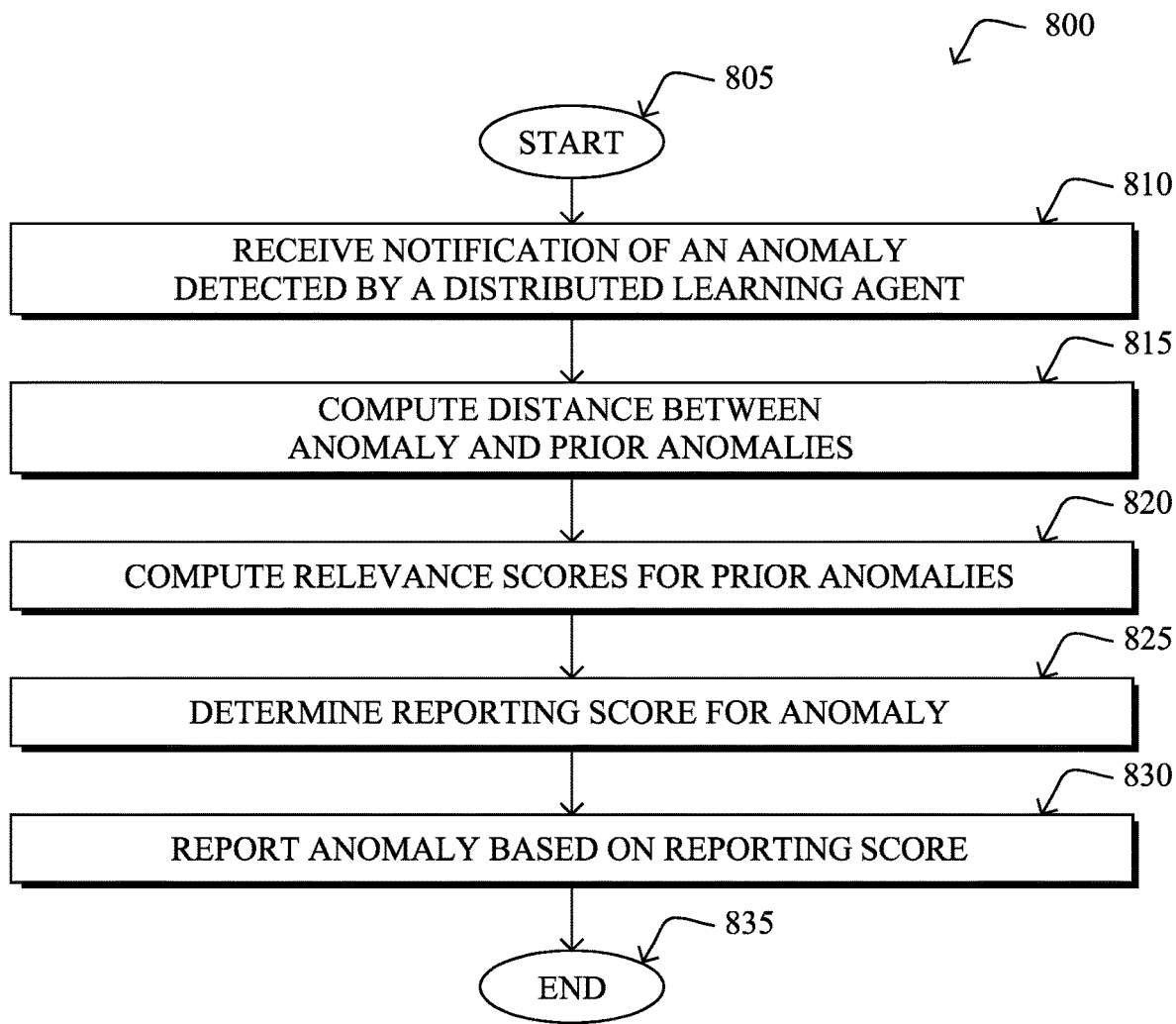
FIG. 8 illustrates an example simplified procedure for reporting a detected anomaly to a user interface.

FIG. 8 illustrates an example simplified procedure for reporting a detected anomaly to a user interface, in a network in accordance with one or more embodiments described herein. For example, a non-generic, specifically configured device (e.g., device 200) may perform procedure 400 by executing stored instructions (e.g., process 248). The procedure 800 may start at step 805, and continues to step 810, where, as described in greater detail above, the device may receive a notification of a particular anomaly detected by a DLA that executes a machine learning-based anomaly detector to analyze traffic in the network. Such a notification may, for example, include information regarding the observed characteristics of the traffic that caused the DLA to deem the traffic anomalous.

At step 815, as detailed above, the device may compute a distance between the particular anomaly from step 810 and one or more prior/previously detected anomalies. In some cases, the distance may be based on static rules that define the distances (e.g., the Euclidean distances between feature vectors, etc.). In further cases, the distance may be based on a dynamic model that is trained using a set of anomaly pairs that are labeled with distances (e.g., based on feedback from a user). In other words, the distance score may have an objective and/or subjective component to it. In some cases, the distance can also be used to compute a similarity score between the particular anomaly and another anomaly. For example, the similarity between the anomalies may drop exponentially as a function of their distance, etc.

At step 820, the device may compute relevance scores for the one or more previously detected anomalies, as described in greater detail above. In many cases, the relevance score for a previously detected anomaly may be based on feedback from a user interface after reporting that anomaly. Notably, certain anomalies may be of greater importance and relevance to a user than others (e.g., when the anomaly is related malware or data exfiltration, as opposed to a newly deployed application, etc.).

At step 825, as detailed above, the device may determine a final reporting score for the particular anomaly based on its distance(s) to the other anomalies and the relevance score(s) of the other anomalies. For example, if the particular anomaly is close/similar to a number of previously detected anomalies that all have high relevance, the device may compute a high relevance score for the particular anomaly, as well.

At step 830, the device may report the particular anomaly to a user interface based on the reporting score for the anomaly, as described in greater detail above. For example, if the reporting score for the particular anomaly is above a given threshold, the device may provide information to the user interface regarding the anomaly, for review by a user. Conversely, if the reporting score is below the reporting threshold, the device may prevent the anomaly from being reported or at least on a push-basis. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for optimized reporting of detected anomalies in a network by taking into account both the relevance and diversity of the events. In some aspects, a supervisory device may selectively report the anomalies detected by any number of deployed anomaly detectors in the network, while still providing a consistent and non redundant aggregate view to the user of all events in the system.

While there have been shown and described illustrative embodiments that provide for the selection of anomalies for purposes of reporting, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, a notification of a particular anomaly detected by a distributed learning agent in the network that executes a machine learning-based anomaly detector to analyze traffic in the network;
computing, by the device, one or more distance scores between the particular anomaly and one or more previously detected anomalies;
computing, by the device, one or more relevance scores for the one or more previously detected anomalies;
computing, by the device, a similarity score between the particular anomaly and the one or more previously detected anomalies using a weighting function that discounts the one or more previously detected anomalies based on the one or more distance scores between the particular anomaly and the one or more previously detected anomalies;
determining, by the device, a reporting score for the particular anomaly using the computed one or more distance scores, the computed similarity score and the computed one or more relevance scores;
reporting, by the device, the particular anomaly to a user interface based on the determined reporting score;
ranking, by the device, the distributed learning agent based on similarity scores between anomalies detected by the distributed learning agent; and
causing, by the device, allocation of network resources to the distributed learning agent for reporting detected anomalies to the device and based on the ranking of the distributed learning agent.

2. The method as in claim 1, wherein computing the one or more distance scores between the particular anomaly and one or more previously detected anomalies comprises:
analyzing, by the device, the particular anomaly using a model trained using a set of anomaly pairs labeled with distance scores.

3. The method as in claim 1, further comprising:
clustering, by the device, detected anomalies based on distance scores between the detected anomalies; and
providing, by the device, an indication of the clustering to the user interface.

4. The method as in claim 1, wherein computing the one or more relevance scores for the one or more previously detected anomalies comprises:
reporting, by the device, the one or more previously detected anomalies to the user interface; and
receiving, at the device, feedback from the user interface regarding relevancy of the reported one or more previously detected anomalies.

5. The method as in claim 1, wherein computing the similarity score comprises: reporting, by the device, two or more of the previously detected anomalies to the user interface; and
receiving, at the device, a similarity score from the user interface regarding a similarity between the reported two or more previously detected anomalies.

6. The method as in claim 1, wherein the network resources comprises a bandwidth allocated to the distributed learning agent.

7. The method as in claim 1, further comprising:
receiving, at the device, notifications regarding the one or more previously detected anomalies, wherein the one or more previously detected anomalies were detected by one or more other distributed learning agents in the network that execute machine learning-based anomaly detectors to analyze traffic in the network.

8. An apparatus, comprising:
one or more network interfaces to communicate with a network;
a processor coupled to the network interfaces and configured to execute one or more processes; and
a memory configured to store a process executable by the processor, the process when executed operable to:
receive a notification of a particular anomaly detected by a distributed learning agent in the network that executes a machine learning-based anomaly detector to analyze traffic in the network;
compute one or more distance scores between the particular anomaly and one or more previously detected anomalies;
compute one or more relevance scores for the one or more previously detected anomalies;
compute a similarity score between the particular anomaly and the one or more previously detected anomalies using a weighting function that discounts the one or more previously detected anomalies based on the one or more distance score between the particular anomaly and the one or more;
determine a reporting score for the particular anomaly using the computed one or more distance scores, the computed similarity score and the computed one or more relevance scores;
report the particular anomaly to a user interface based on the determined reporting score;
rank the distributed learning agent based on similarity scores between anomalies detected by the distributed learning agent; and
cause allocation of network resources to the distributed learning agent for reporting detected anomalies to the apparatus and based on the ranking of the distributed learning agent.

9. The apparatus as in claim 8, wherein the apparatus computes the one or more distance scores between the particular anomaly and one or more previously detected anomalies by:
analyzing the particular anomaly using a model trained using a set of anomaly pairs labeled with distance scores.

10. The apparatus as in claim 8, wherein the process when executed is further operable to:
cluster detected anomalies based on distance scores between the detected anomalies; and
provide an indication of the clustering to the user interface.

11. The apparatus as in claim 8, wherein the apparatus computes the one or more relevance scores for the one or more previously detected anomalies by:
reporting the one or more previously detected anomalies to the user interface; and
receiving feedback from the user interface regarding relevancy of the reported one or more previously detected anomalies.

12. The apparatus as in claim 8, wherein the apparatus computes the similarity score by:
reporting two or more of the previously detected anomalies to the user interface; and
receiving a similarity score from the user interface regarding a similarity between the reported two or more previously detected anomalies.

13. The apparatus as in claim 8, wherein the network resources comprises a bandwidth allocated to the distributed learning agent.

14. The apparatus as in claim 8, wherein the process when executed is further operable to:
   receive notifications regarding the one or more previously detected anomalies, wherein the one or more previously detected anomalies were detected by one or more other distributed learning agents in the network that execute machine learning-based anomaly detectors to analyze traffic in the network.

15. A tangible, non-transitory, computer-readable medium storing program instructions that cause a device in a network to execute a process comprising:
   receiving, at the device, a notification of a particular anomaly detected by a distributed learning agent in the network that executes a machine learning-based anomaly detector to analyze traffic in the network;
   computing, by the device, one or more distance scores between the particular anomaly and one or more previously detected anomalies;
   computing, by the device, one or more relevance scores for the one or more previously detected anomalies;
   computing, by the device, a similarity score between the particular anomaly and the one or more previously detected anomalies using a weighting function that discounts the one or more previously detected anomalies based on the distance score between the particular anomaly and the one or more previously detected anomalies, wherein the reporting score is further based in part on the similarity score;
   determining, by the device, a reporting score for the particular anomaly using the computed one or more distance scores, the computed similarity score and the computed one or more relevance scores;
   reporting, by the device, the particular anomaly to a user interface based on the determined reporting score;
   rank the distributed learning agent based on similarity scores between anomalies detected by the distributed learning agent; and
   cause allocation of network resources to the distributed learning agent for reporting detected anomalies to the apparatus and based on the ranking of the distributed learning agent.

* * * * *